United States Patent
Stillman et al.

(10) Patent No.: US 9,439,402 B2
(45) Date of Patent: Sep. 13, 2016

(54) AQUACULTURE NET AND FLOTATION STRUCTURE

(75) Inventors: Harold M. Stillman, Greenwich, CT (US); Richard Luco Salman, Valdivia (CL)

(73) Assignee: ECOSEA FARMING S.A. (CL)

( * ) Notice: Subject to any disclaimer, the term of this patent is extended or adjusted under 35 U.S.C. 154(b) by 775 days.

(21) Appl. No.: 12/416,740

(22) Filed: Apr. 1, 2009

(65) Prior Publication Data

US 2010/0050952 A1    Mar. 4, 2010

Related U.S. Application Data

(60) Provisional application No. 61/092,342, filed on Aug. 27, 2008.

(51) Int. Cl.
*A01K 61/00*     (2006.01)

(52) U.S. Cl.
CPC ................... *A01K 61/007* (2013.01)

(58) Field of Classification Search
CPC .................................................. A01K 61/007
USPC .............................................. 119/223; 43/56
See application file for complete search history.

(56) References Cited

U.S. PATENT DOCUMENTS

| | | | | |
|---|---|---|---|---|
| 4,671,008 A * | 6/1987 | Lindemood | ............ | 43/54.1 |
| 4,957,064 A * | 9/1990 | Koma | ............ | 119/223 |
| 5,172,649 A * | 12/1992 | Bourgeois | ............ | 119/223 |
| 5,845,602 A * | 12/1998 | Kaarstad | ............ | A01K 61/007 |
| | | | | 119/223 |
| 6,386,146 B1* | 5/2002 | Knott, Sr. | ............ | 119/223 |
| 2009/0229531 A1* | 9/2009 | Stillman | ............ | 119/215 |

FOREIGN PATENT DOCUMENTS

JP        2001190178 A  *  7/2001
WO   WO 2006137128 A1  * 12/2006

* cited by examiner

*Primary Examiner* — Joshua Huson
(74) *Attorney, Agent, or Firm* — DLA Piper LLP (US)

(57) ABSTRACT

An exemplary embodiment of an aquaculture cage of the invention has a buoyant structure configured to float on a water surface, an aquaculture net portion made of a material that is corrodible by salt water and attached to the buoyant structure for positioning a top of the aquaculture net portion at a distance below the water surface, where the aquaculture net portion encloses an interior of the cage from the top of the aquaculture net portion to a bottom of the aquaculture net portion to retain marine life, and an upper enclosure portion enclosing space above the aquaculture net portion for preventing the marine life from escaping over the top of the aquaculture net portion, where the upper enclosure portion comprises a material that is substantially non-corrodible by salt water.

12 Claims, 5 Drawing Sheets

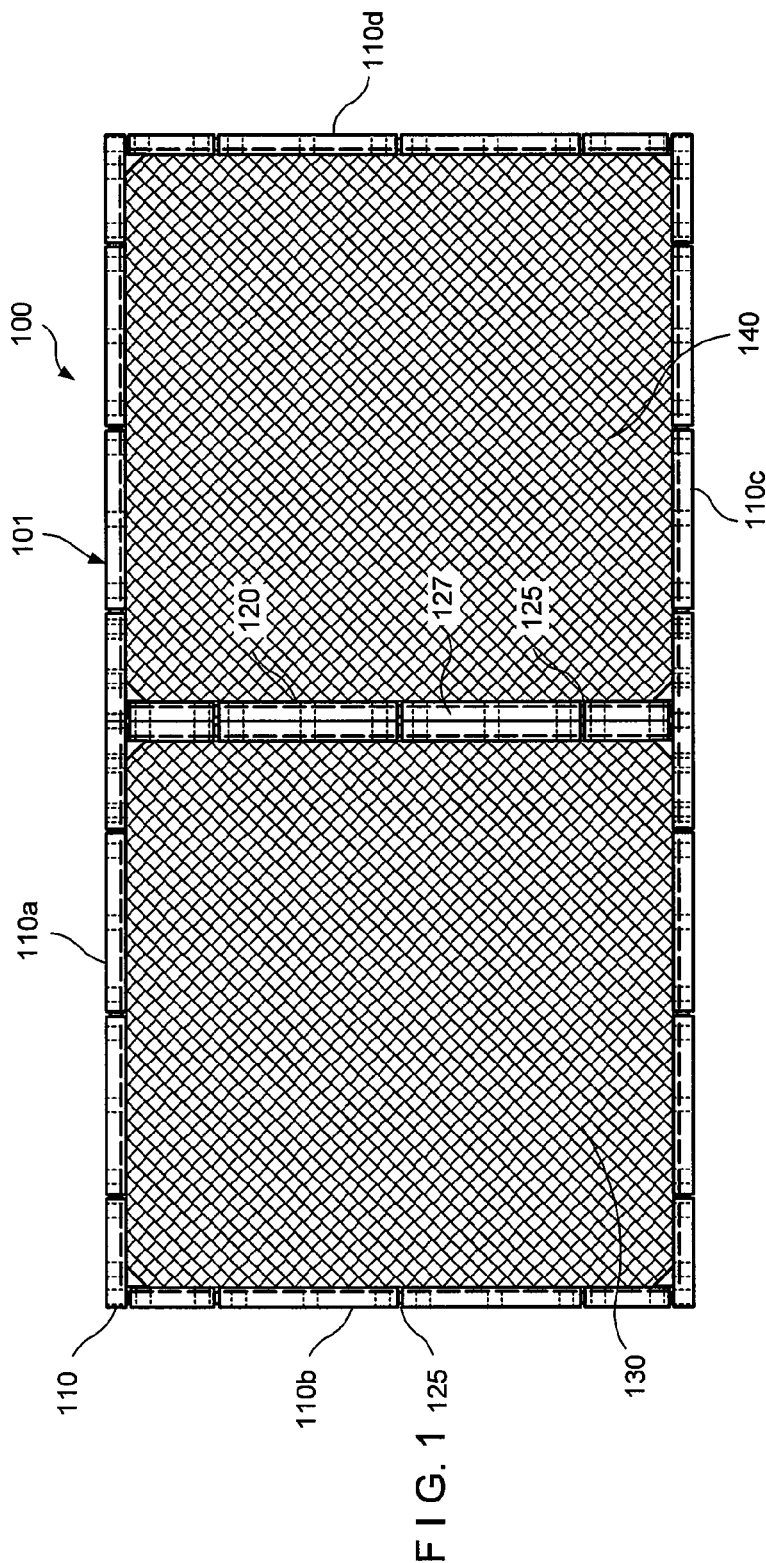
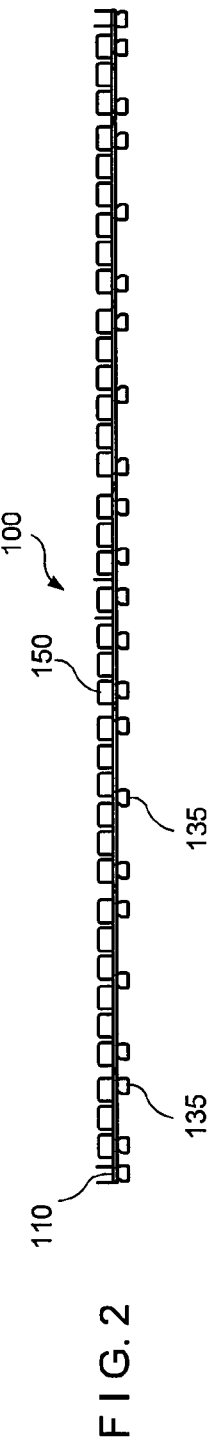
FIG. 1
FIG. 2

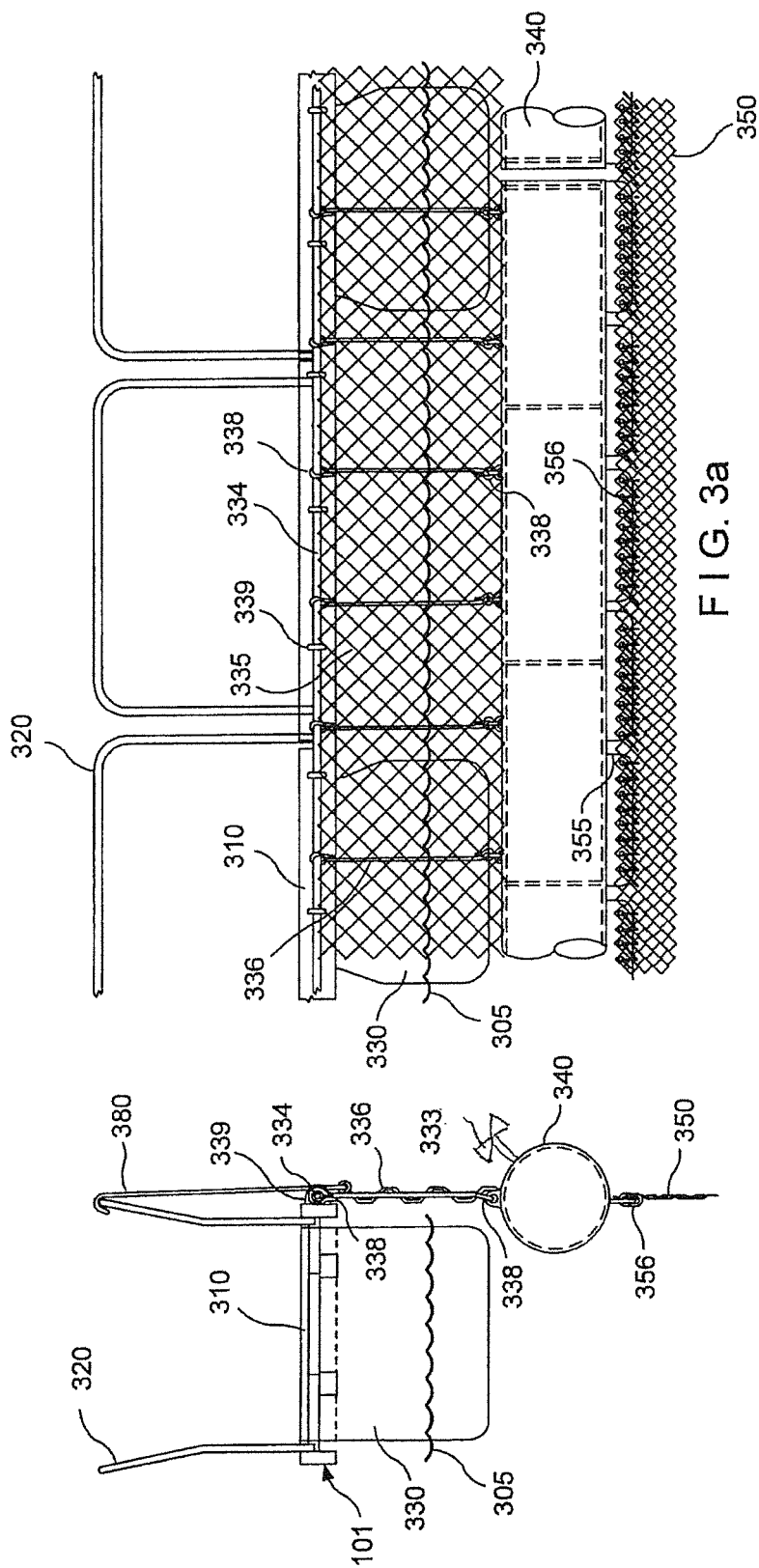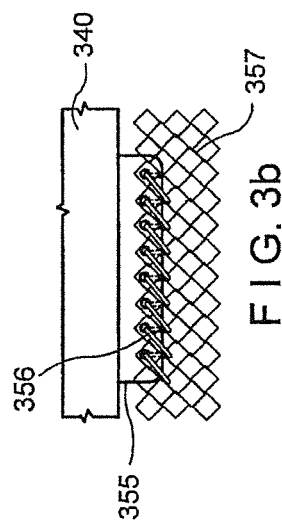

AQUACULTURE NET AND FLOTATION STRUCTURE

TECHNICAL FIELD

The invention relates to an aquaculture cage typically used to contain and harvest fish and other marine life.

BACKGROUND

The marine industry seeks to provide a multitude of fish products by growing fish in a controlled environment. The industry is currently experiencing rapid growth, resulting in a many different types of equipment that are necessary to nurture and harvest fish. When compared to the conventional techniques that are employed by most commercial fishing operations to harvest wild fish, the advantages of marine aquaculture are several, among them are predictable yields in terms of the number of fish harvested, as well as reductions in labor and equipment costs. This is a welcome development both from the standpoint of profitability and meeting the global demand for seafood.

The typical marine aquaculture enclosure has a weighted, polymer fiber mesh net formed into a rectangular, square or round cage that is suspended in a water body by attached flotation devices. The cage contains the fish for a period of months. For example, farm-raised salmon spend about 18 months enclosed in cages. In addition to containing the fish for easy feeding and harvesting, the cage provides protection from aquatic predators such as seals and sea lions. At the end of a given growth period, the fish crop is removed from the cage.

Metallic cages, typically constructed of galvanized steel or special anti-fouling copper alloy wires, are also used in marine aquaculture. The service lifetime of metallic wire nets is limited primarily by mechanical wear, surface corrosion, and fretting corrosion. Wear, leading to holes in the net, is caused by the relative motion of opposing surfaces due to movement of the net as a consequence of wave and water currents or by the repetitive movement of fish against the net. Corrosion of metallic nets reduces the thickness of the net and can lead to failure of the net and escape of the fish. Corrosion significantly shortens the service life of the cage.

In practice, floating structures support a cage constructed of fabricated metal wire that may be woven into netting and assembled to form an enclosure in which fish are contained. Certain alloys, such as those containing a high percentage of copper, also provide resistance to biofouling. This combination of properties provides an advantageous enclosure for fish in seawater environments. However, traditional metal cages are subject to corrosion in seawater that reduces the thickness of the metal net, and this limits the useful life of the cage. Further, corrosion occurs at a significantly higher rate in the top portion of a cage than the continuously submerged portion of the cage. This increased corrosion rate in the surf zone is well known and occurs where the cage is exposed to highly aerated seawater, higher current velocities, and mechanical motion that removes protective oxide films that form on certain metal surfaces, such as copper. High corrosion rates are seen typically within the top one meter of the net. Corrosion rates below one meter diminish significantly.

The corrosive action of sea water consumes and reduces the thickness of the metal nets, thereby limiting the useful life of the cage. It is not always practical, however, to increase the thickness of the metal used in the net to increase service life because this would significantly increase the weight of the net and the size and cost of the flotation system. A typical cage for large scale fish culture can have dimensions of 30 m length by 30 m width by 15 m depth and contain up to 20 tons of metal wire of 4 mm diameter and an opening of 40 mm in the netting. This amount of material can be difficult to handle and requires large floats. This increase in weight places heavy demands on the net flotation and mooring systems.

To address the concerns of corrosion, cages have been developed from synthetic materials such as nylon, plastic, and other polymers. Synthetic cages produce a host of other issues, however. The synthetic materials, including synthetic materials with known antifouling coatings, are susceptible to biofouling, which refers to an accumulation on the net of marine organisms, including parasites and other pathogens that are harmful to the fish being cultivated. The presence of these harmful organisms can lead to diseased fish, requiring the use or increased use of antibiotics or other methods in an attempt to keep the fish healthy. In addition, fouling decreases the flow of clean oxygenated water into the cage which can adversely affect fish health and growth rate.

Thus, there is a need in the art for an aquaculture cage that resists biofouling, provides protection from predators and has improved longevity.

SUMMARY

The present invention is directed to an aquaculture cage. An exemplary embodiment comprises a buoyant structure configured to float on a water surface, an aquaculture net portion made of a material that is corrodible by salt water and being attached to the buoyant structure for positioning a top of the aquaculture net portion at a distance below the water surface, wherein the aquaculture net portion encloses an interior of the cage from the top of the aquaculture net portion to a bottom of the aquaculture net portion to retain marine life therein, and an upper enclosure portion enclosing space above the aquaculture net portion for preventing the marine life from escaping over the top of or entering the aquaculture net portion, the upper enclosure portion comprising a material that is substantially non-corrodible by salt water.

The aquaculture net portion can comprise a material comprising a copper alloy, including copper with tin, zinc, or nickel, or a combination thereof, and can comprise a wire mesh. The upper enclosure portion can comprise a mesh, and can be made of a synthetic material.

The upper enclosure portion can comprise a net flotation device attaching the aquaculture net portion to the buoyant structure and supporting the aquaculture net portion, wherein the buoyancy of the net flotation device counteracts most of a weight of the aquaculture net portion. The buoyancy of the net flotation device can counteract between approximately 80% to 100% of the weight of the net portion. The buoyant structure can comprise the upper enclosure portion.

The aquaculture net portion can be attached to the buoyant structure such that the top of the aquaculture net portion is disposed at least at about 0.5 m below the water surface, or can be disposed no deeper than approximately 3 m below the water surface, or can be disposed no deeper than approximately 1.5 m below the water surface. The aquaculture net portion can extend to a depth below the water surface of between approximately 10 and 20 m, and can have a width and a length at the water surface of between approximately 20 m and 100 m.

Another exemplary embodiment provides an aquaculture cage comprising a buoyant structure configured for floating on a water surface and including a platform above the water surface that has a walkway, a net flotation device movably connected to the buoyant structure, an aquaculture net portion supported by the net flotation device for positioning a top of the aquaculture net portion at a distance below the water surface, the aquaculture net portion enclosing an interior of the cage from the top of the aquaculture net portion to a bottom of the aquaculture net portion to retain marine life therein, and wherein the net flotation device has a buoyancy sufficient to counteract most of the weight of the aquaculture net portion.

The platform and aquaculture net portion can be made of conductive materials, and the net flotation device can be attached to the buoyant structure such that there is a non-conductive association between the aquaculture net portion and platform for reducing galvanic corrosion. The platform and aquaculture net portion can be made of dissimilar metals.

The aquaculture cage can further comprise anchor weights anchoring the floating structure and the aquaculture net portion to a sea floor below the water surface. The aquaculture cage can further comprise an upper enclosure portion enclosing space above the aquaculture net portion for preventing the marine life from escaping over the top of the aquaculture net portion, or entering the aquaculture net portion, wherein the upper enclosure comprises a material that is substantially non-corrodible by salt water, and wherein the aquaculture net portion is made of a material that is corrodible by salt water.

The aquaculture cage can further comprise flexible lines attaching the buoyant structure to the net flotation device. The buoyancy of the net flotation device can counteract between approximately 80% to 100% of a weight of the aquaculture net portion.

Another exemplary embodiment provides an aquaculture cage comprising a buoyant structure configured to float on a water surface, an aquaculture net portion attached to the buoyant structure for positioning a top of the aquaculture net portion at a distance below the water surface, the aquaculture net portion enclosing an interior of the cage from the top of the aquaculture net portion to a bottom of the aquaculture net portion to retain marine life therein, and an upper enclosure portion enclosing space above the aquaculture net portion for preventing the marine life from escaping over the top of the aquaculture net portion, the upper enclosure portion comprising an upper net that is attached to the buoyant structure independently from the aquaculture net portion.

The upper net and aquaculture net portion are connected to the buoyant structure such that the upper net is removable therefrom without removing the aquaculture net portion. The aquaculture net portion can comprise an outer layer that is at least moderately susceptible to erosion by wave action. The aquaculture net portion can be made of titanium or steel, and the outer layer can comprise an antifouling coating.

Another exemplary embodiment provides an aquaculture cage comprising an aquaculture net portion having side walls and a bottom wall enclosing at least a portion of an interior of the aquaculture cage to retain marine life therein, wherein the side walls are made from a corrodible material that is resistant to biofouling, and the bottom wall is made of a non-metallic material that is lighter than and is less resistant to biofouling than the material of the side walls.

BRIEF DESCRIPTION OF THE DRAWINGS

The invention will be better understood in relation to the attached, non-limiting drawings illustrating exemplary embodiments, wherein:

FIG. 1 is a top view of an exemplary embodiment of a platform for a marine aquaculture cage constructed according to the present invention;

FIG. 2 is a side view thereof;

FIG. 3*a* is a front view thereof;

FIG. 3*b* is an enlarged front view thereof showing an attachment of the aquaculture net to a float;

FIG. 3*c* is a side view of the embodiment of FIG. 1;

DETAILED DESCRIPTION

Figure 4:
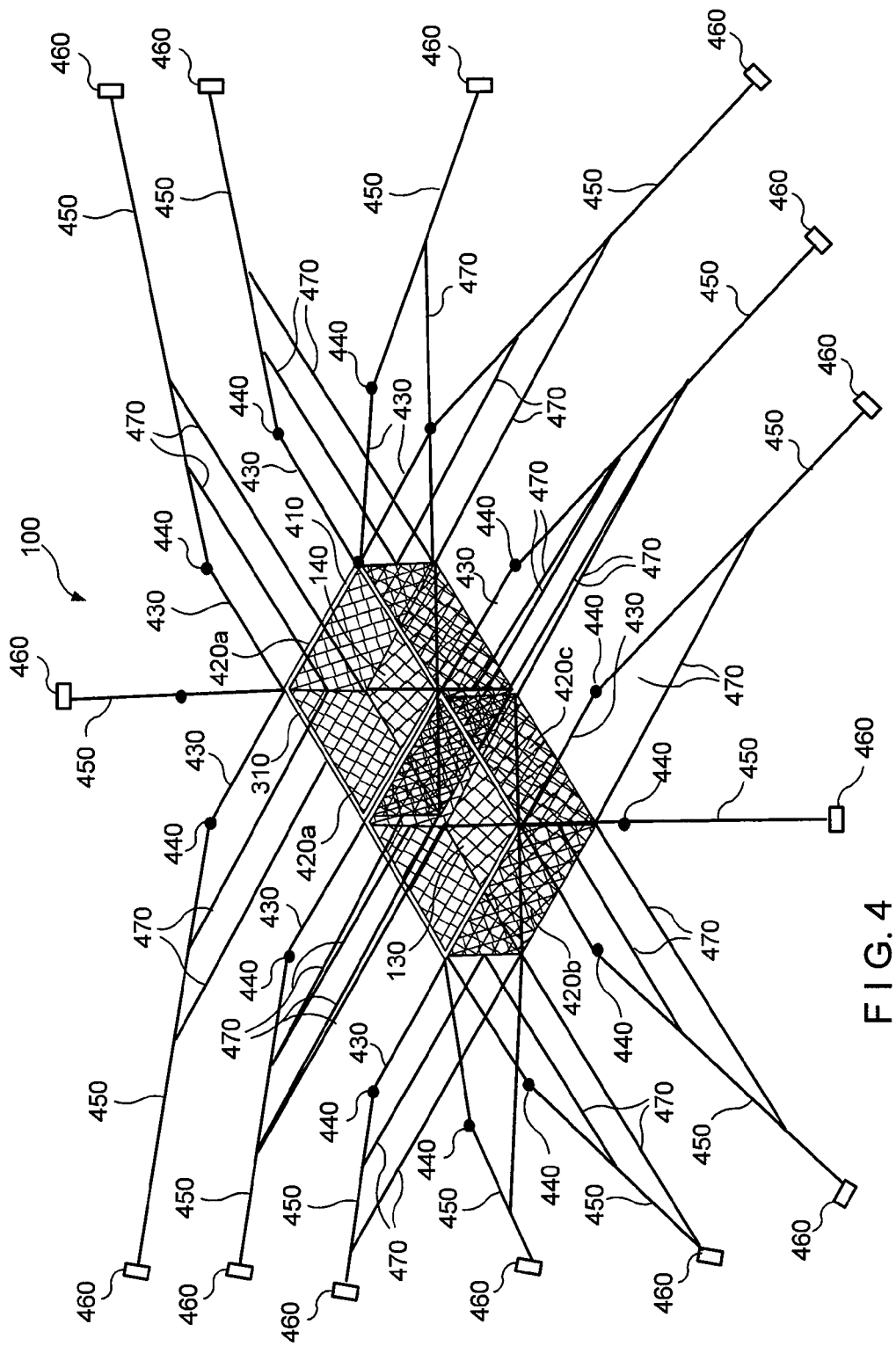
FIG. 4 is a perspective view thereof, showing a structure to secure the cage to the ocean floor.

Referring to FIG. 1, a top view of a cage 100 is shown with a buoyant structure 101 provided having a platform 110 with a walkway of sufficient size and strength to support personnel. Platform 110 comprises platform sides 110*a*, 110*b*, 110*c* and 110*d*, which are preferably arranged in a rectangular formation, such as square, horizontal, etc. Platform 110 can comprise a middle portion 120, providing a walkway between platform sides 110*a* and 110*c*. The platform sides 110*a*, 110*b*, 110*c* and 110*d* and middle portion 120 can be made of a plurality of segments 127, and have articulations 125 between the segments 127 such that they allow the platform 110 to float and ride the waves when placed on the water surface, and to compensate for any difference in water level from segment-to-segment. In a further embodiment, multiple platforms 110 can be fastened together along the outer perimeters thereof to form a large cage assembly.

The preferred platform 110 is made of galvanized steel, although other suitable metals or other materials can be used. The cage 100 can provide aquaculture areas 130, 140, which can provide independent cages or a collective cage for submersion in water to contain marine life for aquaculture. Each aquaculture area 130, 140 is preferably between about 10 m and 50 m in length and width, and most preferably approximately 30 m length and width. The preferred depth of the cage and sidewalls is between about 5 m and 30 m, and more preferably about 15 m. The cage 100 is shown in a rectangular formation having four side walls, although a different number of walls can alternatively be employed and the cage can alternatively have a different shape, such as a rounded cross-section, which can be cylindrical or dome-shaped.

FIG. 2 shows a side view of the cage 100, which can have railings 150 and can support a cover assembly (not shown), such as a cover net to protect the marine life in the aquaculture areas 130, 140 from flying predators, and nets (not shown) to prevent the entrance of marine mammals that might seek to jump over the platform 110 to enter the aquaculture areas 130, 140. These nets can be connected to a cover assembly, and/or to the net below to prevent sea mammals from jumping into the aquaculture areas 130, 140. The buoyant structure 101 includes the platform 110 and floats 135 provided beneath the platform 110 to support the platform 110 above the water surface. The number of floats 135 and the location of the floats 135 can vary based on the requirements of the platform 110.

In FIG. 3a, the aquaculture cage 100 is shown comprising a platform 310 having railings 320 that provide support bars for a person walking on the platform 310. The platform 310 is connected to a platform flotation device 330 (which can comprise separate floats 135, as shown in FIG. 2), that sits on the water at water level 305. In an exemplary embodiment, part of the buoyant platform flotation device 330 preferably floats above the water level 305 with a lower portion being underneath the water level 305 to provide the buoyancy required to float the platform 310, as shown in FIG. 3a.

A net flotation device 340 is also provided, which is preferably connected to the platform 310 and/or to the platform flotation device 330, or other structure as required. The net flotation device 340 can also comprise separate floats similar to the platform flotation device 330, and is preferably movably connected to the buoyant structure 101 and platform 310 and floats separately therefrom. In the exemplary embodiment shown in FIG. 3a, the top of the net flotation device 340 is connected to an attachment such as rod or tube 334 by lines or cables 336, through eyelets 338 or other locking or fastening means known in the art. The net flotation device 340 can also be connected to the tube 340 by ropes that are tied on one end to the net flotation device 340 and on the other end to the tube 334. The tube 334 can be a galvanized steel tube. The tube 334 can extend out of the platform 310 for support as shown in FIG. 3(c). A standoff 339 can be used to fix the lines or cables 336 to the tube 334. The lines 336 are preferably of a non-corrodible material, such as nylon (e.g., sold under the name PERLON®) or other suitable material. Most preferably, the lines 336 are non-conductive.

In the embodiment of FIG. 3a, the net flotation device 340 is sufficiently buoyant to counteract most or all of the weight of an aquaculture net 350 which will be described below. The buoyancy of the net flotation device preferably counteracts approximately 50% to 100% of the weight of the aquaculture net 350, and more preferably 80% to 100% of the weight of the aquaculture net 350. The buoyancy of the net flotation device 340 is enough to counter the aquaculture net 350 underneath so the platform flotation device 330 is not required to support the aquaculture net 350. Thus the platform flotation device 330 can be smaller.

If the net flotation device 340 is to be provided below the water surface 305, an upper enclosure such as upper net 335 can be provided extending from the surface 305 or from above the surface of the water 305 to close off the space above the net flotation device 340 to prevent fish or other marine life from escaping the cage formed by the aquaculture net 350, which will be explained below. In one embodiment, the upper net 335 can be comprised of material that is non-corrodible by seawater, such as synthetic materials like nylon, such as sold under the name PERLON®, plastic, a semi-rigid net system made of polyester monofilament—polyethylene terephthalate—which utilizes a special double-twist knitting method to ensure strength and durability (e.g., such as sold under the name KIKKO NET) and other polymers.

An aquaculture net 350 is provided below the net flotation device 340. The aquaculture net 350 can be connected to the net flotation device 340 by an attachment, such as webbing or ears 355 which extend below the net flotation device 340, although in alternative embodiments, the aquaculture net 350 is attached to another portion of the platform flotation device 330. The aquaculture net 350 is preferably woven to the ears 355 by a line 356 as shown in FIGS. 3b and 3c, which is preferably made of nylon or other suitable material, or by other suitable means, such as fasteners like rings, ties, etc. The aquaculture net 350 extends to a depth below the water surface 305 of between approximately 10 m and 20 m, and has a width and a length at the water surface of between approximately 20 m and 100 m.

The net flotation device 340 preferably lies entirely below the water level 305, although the net flotation device 340 can alternatively float at the surface 305, and a valve 333 or valves can be provided to allow the controlled filling of the floats of the net flotation device 340 with water to alter its buoyancy to select the specific portion of the net 350 weight to be counteracted by the net flotation device 340. In embodiments in which the aquaculture net 350 and net flotation device 340 are below the water surface 305, movement of the buoyant structure 101 and its platform 310 due to wave action can be isolated from the net 350, reducing stress and wear on the net 350, which can remain comparatively substantially stationary. In an alternative embodiment, most of the net 350 is disposed below the water surface, with portions thereof extending to the surface. The depth and size of the net 350 is preferably such that it encloses a major portion or all of the interior of the cage.

In one exemplary embodiment, the aquaculture net 350 can be comprised of a corrodible material, such as metals, stainless steel, aluminum, plastic coated metal, copper, cupro-nickel, monel, galvanized steel, galvanized (e.g., 5% aluminum 94% zinc+mishmetal) steel, and aluminized steel. In a preferred embodiment, the aquaculture net 350 is made of copper alloy, which can include copper with tin, zinc, or nickel, or a combination thereof. The alloy can be brass or bronze, for instance. In another embodiment, the aquaculture net 350 is formed of about 90% copper and about 10% nickel. In another embodiment, the composition of the aquaculture net 350 is about 64% copper, about 35% zinc, about 0.6% tin, and about 0.3% nickel. One example of the wire material that can be used for the aquaculture net 350 is available from Sambo Copper Alloy Co, Ltd, as the UR30 alloy. The aquaculture net 350 can comprise a wire mesh, as shown in FIG. 3c, comprising a woven arrangement of interlocking links 357. The depth of the aquaculture net 350 can vary depending on the depth needed for the particular cage. The aquaculture net 350 can be either directly or indirectly connected to the platform 310.

As shown in FIG. 3(c), a line 380 or other means can also be provided connected to the net flotation device 340 on one end, and can be attached to the rail 320 on the platform on the other end to pull up on the net flotation device 340. Line 380 is preferably interwoven through the upper net 335, and can be adjacent or over support lines 336, and attached to the platform flotation device 330 together with support lines 336. The net flotation device 340 can be raised or lowered in this manner. The aquaculture net 350 is shown connected to the bottom of the net flotation device 340. Because the aquaculture net 350 is supported by the net flotation device 340, there is less torque applied to the platform 310.

The platform 310 and aquaculture net 350 can be made of conductive materials, and the net flotation device 340 can be attached to the platform flotation device 330 such that there is a non-conductive association between the aquaculture net 350 and platform 310 for reducing galvanic corrosion. The platform 310 and aquaculture net 350 can be made of dissimilar metals.

It has been found that corrosion is particularly pronounced and occurs at a higher rate in the region near the surface of the water, and is especially pronounced at about the top half meter to top meter in depth. This is attributable to several factors, most prominent of which are the presence of highly aerated seawater in the surf zone, as well as higher current velocities and mechanical agitation that can act to remove any protective metal oxide film that can be formed on the metal surface, such as a copper metal surface.

The aquaculture cage 100 is constructed so the aquaculture net 350 begins at a depth of water where corrosion is less. Corrosion rates are higher at the surface of the water 305, where the cage 100 is exposed to more air and more turbulence, and mostly, the first 1-2 meters of depth from the surface of the water 305. Therefore, the depth of the aquaculture net 350 is preferably approximately 1-2 meters below the water level 305, but can vary depending on the properties of the body of water. Accordingly, the height and depth of the platform flotation device 330 and the height and depth of the net flotation device 340 can be adjusted or constructed accordingly, so the depth of the aquaculture net 350 is at a level where corrosion is less likely to occur in the body of water. The heights and depths can be adjusted based on properties of the body of water. Because the aquaculture net 350 is below a water level 305 where most corrosion occurs, it will not be susceptible to as much corrosion as would occur at the surface 305.

In one embodiment, in the aquaculture cage 100 shown in FIG. 3, the upper net 335 can be made of a non-corrodible material such as nylon, so that less corrosion occurs and it is easier to access and clean. The aquaculture net 350 can be comprised of a corrodible material, as described above, such as a metal such as copper or copper alloy. Copper alloys can be used for the aquaculture net 350 for their antifouling and antibacterial properties, which can create a healthier aquaculture environment within the cage 100. By using a suitable copper alloy instead of a synthetic material, the number of organisms that are able to attach and grow on the cage is significantly reduced, if not eliminated. For example, when compared to nylon nets after several months of use, copper alloy nets have been found to exhibit 5% or less blockage, compared to 75% or more for nylon nets. It has been found that by using copper alloy cages, the amount or density of the farmed marine life within the cages can be increased over synthetic cages. Additionally, predators, such as sea lions, have been found to avoid the stiffer copper nets, instead of bumping into them to reach dead marine life that has fallen to the bottom of the cage as they tend to do regularly with synthetic cages. The use of metallic or other conductive cages can also deter attacks from other predators, such as sharks, that use electrosensing to locate prey as it distorts the electrical fields.

Consequently, a major reduction in the number of pathogens and parasites can be achieved in the aquaculture net 350. Fewer pathogens or bacteria result in fewer infected fish, as well as an increase in the amount of oxygenated water that can reach the fish. This improved environment, created by the cage 100 described herein, results in healthier fish and is able to sustain more fish. When compared to cages using a nylon net, copper alloy fish cages have shows a 50% increase in the number of fish per cage, and around 10-15% faster fish growth. Increased yields lead to greater profits and reduced operating cost per unit. Because nylon or another synthetic material can be used in the upper net 335, it is easier to access change or clean, while this part of the net does not corrode in the upper surface of the water, where more of the corrosion occurs. Therefore, the useful life of the nets and cage is increased.

In one embodiment, the aquaculture net 350 can have graded compensated degradation qualities such that an upper portion of the aquaculture net 350 are more corrosion-resistant, while the lower portion of the aquaculture net 350 in less corrosive areas are less corrosion resistant. In one embodiment, the wire mesh of the upper portion of the aquaculture net 350 and the wire mesh of the lower portion of the aquaculture net 350 are of differing average, and can be of a minimum material thicknesses. The difference in material thickness throughout the aquaculture net 350 can be selected to compensate for differences in corrosiveness of the environments surrounding the upper and lower portions. Typically, corrosion rates are higher at the surface of the water, where the cage is exposed to more air and more turbulence. In an exemplary embodiment, the average material thickness of the upper portion of the aquaculture net 350 is greater than the material thickness of the lower portion of the aquaculture net 350. The increased thickness of the upper portion also helps the cage withstand corrosion. In an exemplary embodiment, the diameter of the wires of the mesh of the upper portion of the aquaculture net 350 is greater than the diameter of the wire mesh of the lower portion of the aquaculture net 350, as disclosed, for example, in U.S. patent application Ser. No. 12/049,010, filed on Mar. 14, 2008, which is fully incorporated by reference herein.

FIG. 4 shows a perspective view of an aquaculture cage 100 and aquaculture net 410. The side walls 420*a*, 420*b*, 420*c* and 420*d* of the aquaculture net 410 located adjacent and below platform sides 110*a*, 110*b*, 110*c* and 110*d* enclose aquaculture areas 130, 140. In the embodiment shown in FIG. 4, a middle wall separating aquaculture areas 130, 140, and bottom walls enclose the cage 100 so that marine life cannot escape from the aquaculture areas 130, 140. The middle walls and bottom walls can be made of a wire mesh. Attached to the aquaculture net 410 on top portions of the side walls 420*a*, 420*b*, 420*c* and 420*d* are lines 430 that attached the aquaculture net 410 to floats, such as a buoys 440 spaced from the cage 100. Lines 450 connect the buoys 440 to weights 460 at the other end. The weights 460 help keep the aquaculture net 410 in a desired shape and hold the aquaculture net 410 in place in the body of water. Preferably, lines 470 are also provided that connect middle and bottom portions of the side walls 420*a*, 420*b*, 420*c* and 420*d* of the aquaculture net 410 to lines 450, that are connected to the weights 460 on the sea floor. These lines can help maintain the shape and structure of the aquaculture net 410.

In another embodiment of an aquaculture cage, the aquaculture net can be directly connected to the platform flotation device. The aquaculture net can be connected to the platform and/or the platform flotation device. An upper net portion of the aquaculture net can be comprised of a non-corrodible material in seawater, such as synthetic materials such as nylon, such as sold under the name PERLON®, plastic, polyethylene terephthalate (such as sold under the name KIKKO NET) and other polymers. The height of the upper net portion can vary, but can be a depth in which corrosion would be greatest in the particular body of water. A lower net portion of the aquaculture net can comprise a corrodible material, such as copper, and can extend in height as required for the depth of the cage. The lower net portion is preferably a wire mesh. The makeup of the aquaculture net, using a non-corrodible material in the upper portion and a corrodible material for the lower portion allows for a longer life of the net. Because the fastest corrosion typically occurs in the upper area of the body of water, the makeup of the aquaculture net is selected to withstand a greater level of corrosion in the upper portion. Further, any biofouling that takes place occurs in the upper net portion, where access is easier for cleaning or net changing. Biofouling can be significantly reduced or eliminated preferably in the lower net portion by making the lower portion of a material that resists or prevents the biofouling, such as copper or other metal or metal alloys.

In another embodiment, the aquaculture cage can comprise a buoyant structure configured to float on a water surface. An aquaculture net portion can be attached to the buoyant structure for positioning a top of the aquaculture net portion at a distance below the water surface, so that the aquaculture net portion encloses an interior of the cage from the top of the aquaculture net portion to a bottom of the aquaculture net portion to retain marine life therein. An upper enclosure portion is provided to enclose space above the aquaculture net portion for preventing the marine life from escaping over the top of the aquaculture net portion. The upper enclosure portion can have an upper net that is attached to the buoyant structure independently from the aquaculture net portion. The upper net and aquaculture net portion are connected to the buoyant structure such that the upper net is removable therefrom without removing the aquaculture net portion, and/or vice versa. The aquaculture net portion can comprise an outer layer that is at least moderately susceptible to erosion by wave action, such as steel, stainless steel and titanium. The outer layer can have an antifouling coating that resists biofouling and strong enough to resist predators' attempts to breach the lower net. The antifouling coating can be copper-based. In relation to copper, titanium erodes very slowly.

The aquaculture cage of the present invention allows the cage and net to be used and installed in aquaculture cages on existing or new floating platforms/walkways without modifying the platform flotation or walkway joints. The cage/net can be constructed of any size required, and used on new or existing platforms. The dynamics of the cage/net can be tuned to withstand a variety of sea conditions.

Figure 5:
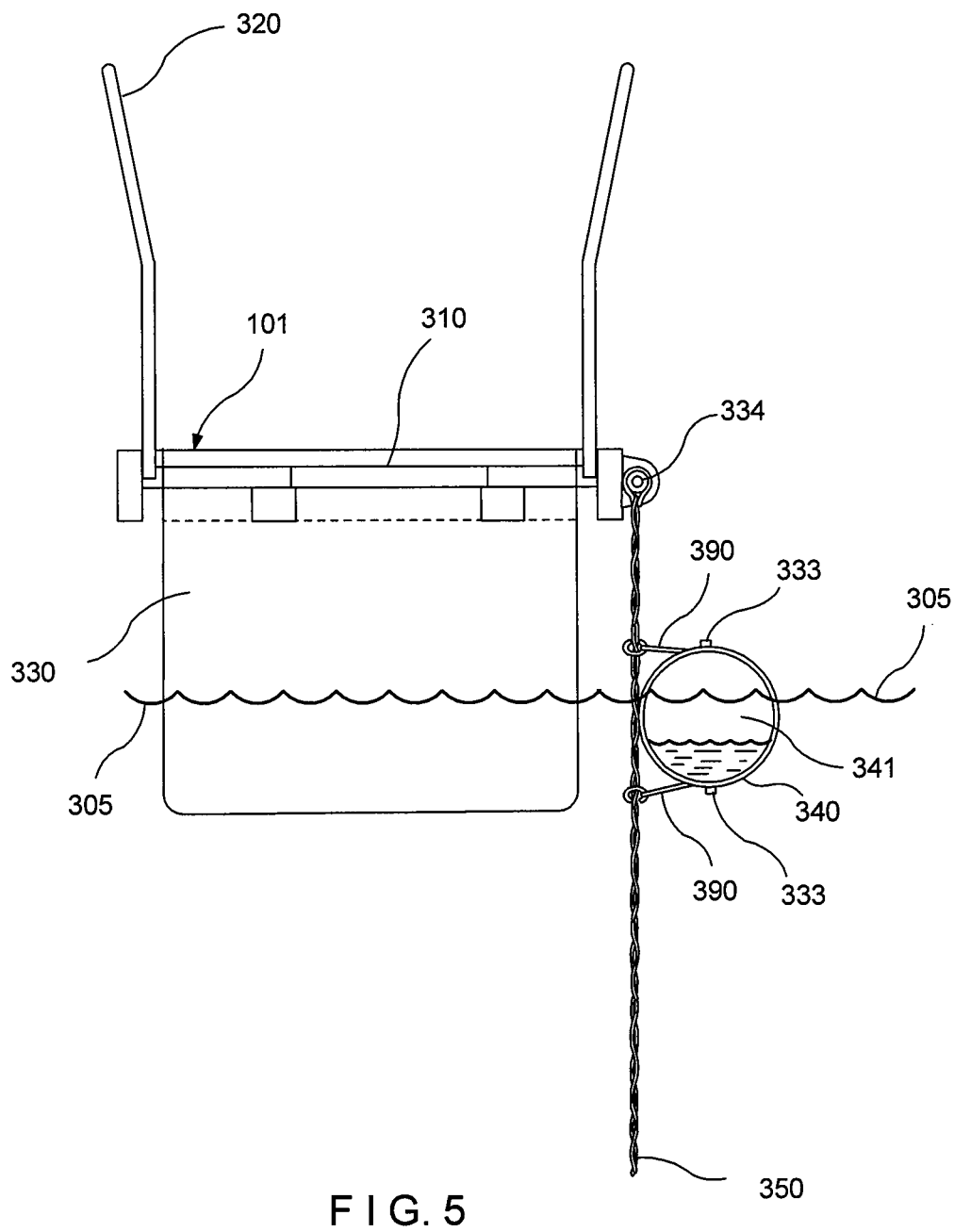
FIG. 5 is a side view of another embodiment of the aquaculture cage.

In another exemplary embodiment as shown in FIG. 5, the net flotation device 340 can be attached directly to the aquaculture net 350, and the top of the aquaculture net 350 can be supported directly by to the platform 310, such as by attachment directly to tube 334. Electrical insulation can be provided between the net 350 and the platform 310, such as between the net 350 and the tube 334. In this embodiment, the net flotation device 340 counteract the weight of the aquaculture net 350 via its attachment directly to the net 350, for example somewhat below the top of the net 350. The net flotation device 340 can be attached to any portion of the net 350 so that it is partially or entirely submerged in the assembled cage, but is preferably attached near the upper part of the net 350 to support most or all of the submerged net weight. In the embodiment shown, the net 350 is attached to the buoyant structure 101 on the inner side of the cage, and the net flotation device 340 is attached to the net 350 on the inner side thereof so that it is not directly below the buoyant structure 101 to facilitate access thereto.

The net flotation device 340 can be connected to the aquaculture net 350 by cables 390, or by other means known in the art. The cables 390 can be a copper alloy and/or the same material as the aquaculture net 350 or can be of another suitable material, such as a synthetic material like nylon, plastic, and other polymers.

A valve or valves 333 are preferably provided to allow the controlled filling of the float of the net flotation device 340 with water to alter its buoyancy to select the specific portion of the net 350 weight to be counteracted by the net flotation device 340. The float is shown partially filled with water in its interior 341, and the float is shown only partially below the water surface 305.

Figure 6:
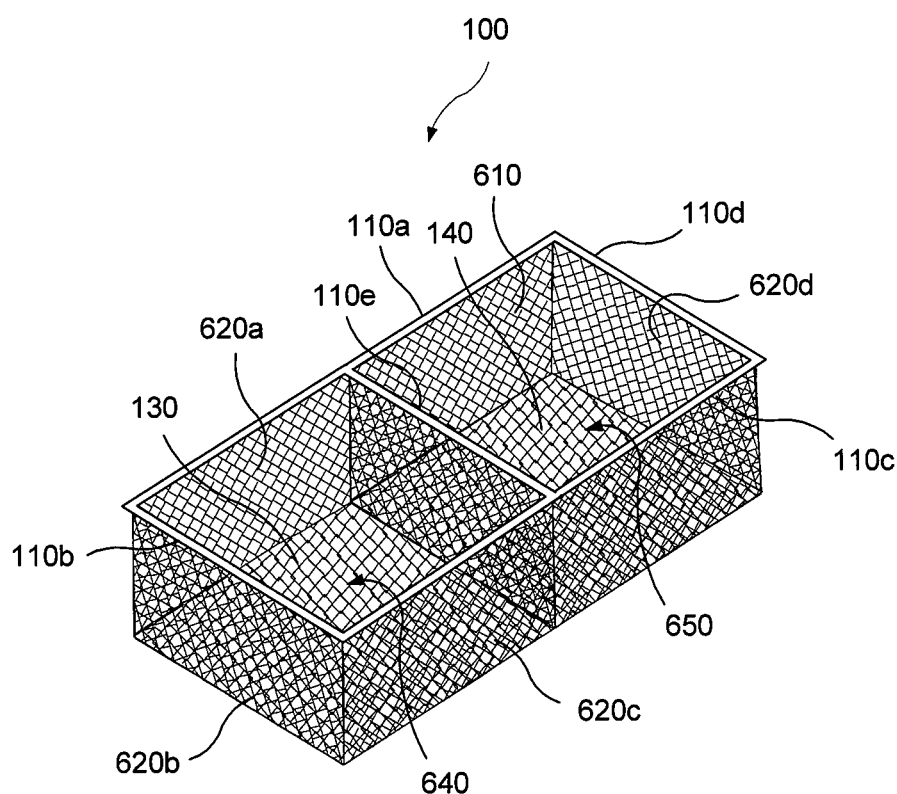
FIG. 6 is a perspective view of an exemplary embodiment of an aquaculture cage.

FIG. 6 shows a perspective view of another exemplary embodiment of an aquaculture cage 100, including aquaculture nets 610. The side walls 620a, 620b, 620c and 620d of the aquaculture net 610 located adjacent and below platform sides 110a, 110b, 110c-11d, and 110e enclose aquaculture areas 130, 140. The side walls of this embodiment are made of a corrodible material, such as metals, stainless steel, aluminum, plastic coated metal, copper, cupro-nickel, monel, galvanized steel, galvanized (e.g., 5% aluminum 94% zinc+mishmetal) steel, and aluminized steel. In a preferred embodiment, the aquaculture net 350 is made of copper alloy, which can include copper with tin, zinc, or nickel, or a combination thereof. The alloy can be brass or bronze, for instance. In another embodiment, the aquaculture net 350 is formed of about 90% copper and about 10% nickel. In another embodiment, the composition of the aquaculture net 350 is about 64% copper, about 35% zinc, about 0.6% tin, and about 0.3% nickel. One example of the wire material that can be used for the aquaculture net 350 is available from Sambo Copper Alloy Co, Ltd, as the UR30 alloy.

The bottom walls 640, 650 in FIG. 6 can be made of a lighter material than the sidewalls, such as a material that is susceptible to biofouling and/or is non-corrodible in seawater. Synthetic and other non-metallic materials can be used. Suitable materials include synthetic materials such as nylon, such as sold under the name PERLON®, plastic, polyethylene terephthalate (such as sold under the name KIKKO NET) and other polymers. The bottom walls can be made in a thickness and configuration that is resistant to predatory sea animals, such as sharks, so that all sides of the cage is resistant to predators.

Further, this embodiment can reduce the weight of the bottom walls 640, 650, thus reducing the weight carried by the side walls 620a, 620b, 620c and 620d of the aquaculture net 610 and the platform and/or flotation devices used to support the aquaculture net 610. It is beneficial to replace the bottom wall with a material that is susceptible to biofouling, or more susceptible or less resistant thereto than the side walls, while retaining the antifouling sidewalls which extend downward, because the bottom, more horizontal wall is easier to clean than more inclined or vertical walls. Automated cleaning and vacuum devices, such as pool cleaners can be used. Consequently, these structuring can also be made lighter.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention can be modified or varied without departing from the invention, as will be appreciated by those skilled in the art in light of the above teachings. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. An aquaculture cage, comprising:
   a buoyant structure configured to float on a water surface and including a platform above the water surface that has a walkway;
   a net flotation device movably connected to the buoyant structure and having alterable buoyancy independent of the buoyancy of the buoyant structure, said alterable buoyancy being provided by one or more valves that control filling with water of a float which is part of the net flotation device;

an aquaculture net portion made of a material that is corrodible by salt water and being attached to the buoyant structure by the net flotation device and being attached to a lower portion of the net flotation device by ears which extend below the net flotation device and is connected by an intertwining synthetic wire between the net and the ears for positioning a top of the aquaculture net portion at a distance below the water surface, the aquaculture net portion enclosing an interior of the cage from the top of the aquaculture net portion to a bottom of the aquaculture net portion to retain marine life therein; and an upper enclosure portion attached to an upper portion of the net flotation device and having at least a portion of the upper enclosure portion disposed below the water surface enclosing space above the aquaculture net portion for preventing the marine life from escaping over the top of the aquaculture net portion, the upper enclosure portion comprising a material that is non-corrodible by salt water, wherein the net flotation device supports the aquaculture net portion, and wherein the buoyancy of the net flotation device counteracts most of a weight of the aquaculture net portion such that the alterable buoyancy of the net flotation device is alterable to lift and support the upper enclosure portion above the water surface with the aquaculture net portion remaining below the water surface.

2. The aquaculture cage of claim 1, wherein the aquaculture net portion comprises a material comprising a copper alloy, including copper with tin, zinc, or nickel, or a combination thereof.

3. The aquaculture cage of claim 2, wherein the aquaculture net portion comprises a wire mesh.

4. The aquaculture cage of claim 1, wherein the upper enclosure portion comprises a mesh.

5. The aquaculture cage of claim 1, wherein the upper enclosure portion is made of a synthetic material.

6. The aquaculture cage of claim 1, wherein the buoyancy of the net flotation device counteracts between approximately 80% to 100% of the weight of the net portion.

7. The aquaculture cage of claim 1, wherein the buoyant structure comprises the upper enclosure portion.

8. The aquaculture cage of claim 1, wherein the aquaculture net portion is attached to the buoyant structure such that the top of the aquaculture net portion is disposed at least at about 0.5 m below the water surface.

9. The aquaculture cage of claim 8, wherein the aquaculture net portion is attached to the buoyant structure such that the top of the net portion is disposed no deeper than approximately 3 m below the water surface.

10. The aquaculture cage of claim 8, wherein the aquaculture net portion is attached to the buoyant structure such that the top of the aquaculture net portion is disposed no deeper than approximately 1.5 m below the water surface.

11. The aquaculture cage of claim 1, wherein the aquaculture net portion extends to a depth below the water surface of between approximately 10 and 20 m, and has a width and a length at the water surface of between approximately 20 m and 100 m.

12. The aquaculture cage of claim 1, wherein the platform and aquaculture net portion are made of conductive materials, and the net flotation device is attached to the buoyant structure such that there is a non-conductive association between the aquaculture net portion and platform for reducing galvanic corrosion.

* * * * *